(12) United States Patent
Krupnik

(10) Patent No.: US 11,127,434 B2
(45) Date of Patent: Sep. 21, 2021

(54) TIMECODE GENERATOR WITH GLOBAL ACCURACY AND FLEXIBLE FRAMERATE

(71) Applicant: Ari Krupnik, Plano, TX (US)

(72) Inventor: Ari Krupnik, Plano, TX (US)

(*) Notice: Subject to any disclaimer, the term of this patent is extended or adjusted under 35 U.S.C. 154(b) by 0 days.

(21) Appl. No.: 17/127,516

(22) Filed: Dec. 18, 2020

(65) Prior Publication Data

US 2021/0193186 A1  Jun. 24, 2021

Related U.S. Application Data

(60) Provisional application No. 62/950,757, filed on Dec. 19, 2019.

(51) Int. Cl.
*G11B 27/10* (2006.01)
*G11B 33/02* (2006.01)
*H04N 5/77* (2006.01)

(52) U.S. Cl.
CPC ............ *G11B 27/10* (2013.01); *G11B 33/022* (2013.01); *H04N 5/772* (2013.01)

(58) Field of Classification Search
CPC ....... G11B 27/10; G11B 33/022; H04N 5/772
See application file for complete search history.

(56) References Cited

U.S. PATENT DOCUMENTS

| 2009/0142032 A1* | 6/2009 | Myokan | H04N 5/772 |
| | | | 386/248 |
| 2015/0243328 A1* | 8/2015 | Tako | H04N 21/8547 |
| | | | 386/203 |
| 2019/0215662 A1* | 7/2019 | Min | G01S 5/06 |

* cited by examiner

*Primary Examiner* — Thai Q Tran
*Assistant Examiner* — Jose M Mesa
(74) *Attorney, Agent, or Firm* — Schwegman Lundberg & Woessner, P.A.

(57) ABSTRACT

Described herein are systems, devices and techniques for generating timecode for use in logging and identifying content in a recorded medium, and for use in synchronizing such content when captured and recorded to separate media via separate recording devices. Consistent with some embodiments of the invention, the timecode is generated based on a radio-based time signal that represents a universally accepted time standard (e.g., Coordinated Universal Time), thereby eliminating the need to configure and maintain a master clock distribution scheme as part of a timing synchronization system. Additionally, consistent with some embodiments, the timecode is generated to support any one of multiple framerates.

20 Claims, 12 Drawing Sheets

| UTC SECOND | DELAY UNTIL NEXT NTSC SECOND | NEXT NTSC SECOND |
|---|---|---|
| 00:00:00 | 0.000 S | 00:00:00 |
| 00:00:01 | 0.001 S | 00:00:01 |
| 00:00:02 | 0.002 S | 00:00:02 |
| 00:00:03 | 0.003 S | 00:00:03 |
| * | * | * |
| * | * | * |
| * | * | * |
| 00:16:40 | 0.999 S | 00:16:40 |
| 00:16:41 | 0.000 S | 00:16:40 |
| 00:16:42 | 0.001 S | 00:16:41 |
| 00:16:43 | 0.002 S | 00:16:42 |
| * | * | * |
| * | * | * |
| * | * | * |
| 00:33:20 | 0.999 S | 00:33:20 |
| 00:33:21 | 0.000 S | 00:33:20 |
| 00:33:22 | 0.001 S | 00:33:20 |
| 00:33:23 | 0.002 S | 00:33:21 |

FIGURE 11

TIMECODE GENERATOR WITH GLOBAL ACCURACY AND FLEXIBLE FRAMERATE

RELATED APPLICATIONS

This patent application claims a priority benefit to U.S. Provisional Patent Application No. 62/950,757, entitled "Timecode Generator with Global Accuracy and Flexible Frame Rate," filed on Dec. 19, 2019, which is incorporated herein by reference in its entirety.

TECHNICAL FIELD

The present application generally relates to devices, systems and techniques for generating timecode for use in logging and identifying content in a recorded medium, and for use in synchronizing such content when captured and recorded to separate media via separate recording devices. Specifically, some embodiments of the present invention provide improved techniques for generating timecode based on a publicly available, and in some instances globally available, radio-based time signal, while supporting multiple framerates, including non-integer framerates that do not align with the time base of the radio-based time signal.

BACKGROUND

In video production and/or filmmaking, it is common to use multiple recording devices to capture events and performances. It is often desirable to record multiple view angles of the same scene. It is equally desirable to record multiple sources of sound, independently. Traditional film cameras lack sound-recording capability and require recording sound on a separate sound recording device. More recent digital motion picture cameras can record sound along with moving picture. Nonetheless, many productions prefer using separate sound recorders for their greater sound quality and flexibility on set. Additionally, it is often desirable to synchronize events or performances that occur in multiple, distant locations. However, using conventional techniques, this becomes a costly proposition as it will often involve sending professional technicians to each location to help configure and operate the conventional equipment used for synchronizing media captured with different equipment in different locations.

FIG. 1 shows a diagram depicting the use of multiple recording devices in a video production context 100. For example, as shown in FIG. 1, during a production phase, multiple recording devices—including multiple cameras and multiple sound recording devices—are used to independently capture and record an event or performance. As a result, the recorded event or performance is captured to separate media, via the separate recording devices. During the post-production phase, a software-based editing tool is typically used to synchronize the various instances of the recorded event or performance as captured and recorded as separate media. For instance, in FIG. 1, a software-based editing tool is shown to include what is commonly referred to as a "timeline view" 102 of the independent recordings, including three separate video clips, and two separate audio clips. An end-user (e.g., typically an Editor) of the software-based editing tool must manually align or synchronize the various clips. That is, using the software-based editing tool, the end-user must manipulate the clips via the user interface of the editing tool in an attempt to align the various clips to ensure proper synchronization of video and audio during playback. The task of synchronizing the recordings is labor-intensive and error-prone. Generally, the end-user must review all media, sometimes hundreds of files per day, to identify the individual recordings that are associated with one another by virtue of having been simultaneously captured during the event or performance. The end-user must then group media by shot—that is, those recordings that have some portion that overlap in time. Then, within each shot, the end-user must align the start of clips such that the video and sound in each correspond to all other media in the same set. The more media clips that are associated with a particular instance of the recorded event or performance, the longer it will take to identify, organize and synchronize, and the more likely it is that an error will occur.

The problem of synchronizing media in post-production is as old as sound in film. One of the earliest solutions, and one still in common use today, is the clapper slate. During a recording session, a person holds the clapper slate within the field of view of the recording device, and claps the sticks together. This event is captured on the video recording and on the sound recording. In post-production, another person aligns the frame of the video recording where the sticks come together with the audible clap on the sound recording. The process is manual, labor intensive and imprecise.

Another solution to the various problems associated with organizing and synchronizing media in post-production involves the use of what is referred to as timecode. In film and video, a frame (e.g., a single still image) represents the smallest and most precise quantum of time. Depending upon the framerate in use, a certain number of frames are presented in rapid succession to create the perception of a moving picture. Generally, timecode is a way to generate a unique name or address for each frame of a film or video recording. By way of example, consider FIG. 2, which shows two diagrams illustrating two different conventions for addressing individual frames of a recording. In the top section of FIG. 2, a portion of a 35 mm film 200 is shown. The portion of 35 mm film 200 shown in FIG. 2 includes seven individual frames, including frames with reference numbers, 202, 204 and 206. In this example, the individual frames are addressed by specifying a distance, for example, measured in feet, and then a frame count. In this example, the 35 mm film 200 has sixteen frames per foot of film, so each frame can be addressed via an expression that indicates a distance—the number of feet from the beginning of the film—and, a frame number between zero and fifteen, which identifies the frame count of the particular frame within the last one-foot section of film. Referring to the example in FIG. 2, the frame with reference number 202 has the address, "139' +14" indicating that the frame is one-hundred, thirty-nine feet from the beginning of the film, and the fifteenth (of sixteen) individual frame after the frame that falls at the one-hundred, thirty-nine foot distance marker. Similarly, the individual frame with reference number 204 has a unique address expressed as "140'," while the individual frame with reference number 206 has the address, "140' +4." While expressing an address as a distance might make sense for film, given that access to individual frames is necessarily subject to sequential access methods, it makes less sense with modern digital video recordings stored on conventional memory storage devices that provide non-sequential access.

Starting in 1969, the Society of Motion Picture and Television Engineers (SMPTE) developed a series of standards for timecode distribution—generally referred to as SMPTE timecode. These standards describe an electrical signal that encodes precise timestamps, specified in terms of time, for example, hour (HH), minute (MM), second (SS)

and frame (FF) within the second. Typical supported framerates include 23.98, 24, 25, 29.97 and 30 frames per second. Accordingly, an individual timestamp has the format, HH:MM:SS:FF, where the reference to the frame within the second will be dependent upon the framerate in use. With SMPTE timecode, each individual timestamp uniquely addresses an individual frame of a video recording and/or a portion of an audio recording.

Referring once again to FIG. 2, a portion of a helical scan video tape 208 is illustrated. In this example, the individual frames are represented as slanted stripes, with guard bands (unrecorded areas) between the stripes that represent the individual frames. Consistent with this example, the framerate is 30 frames per second, and the unique address assigned to each frame is expressed in a format consistent with SMPTE timecode, HH:MM:SS:FF, where HH, MM and SS, represent the number of hours, minutes, and seconds from some initial reference time. Accordingly, as shown in FIG. 2, the first frame with reference number 210, is assigned the address, "00:59:59:29." The individual frames with reference numbers 212, 214 and 216 have the addresses, "01:00:00:00," "01:00:00:01," and "00:00:00:02."

With systems implementing SMPTE timecode, a local master clock generates the timecode signal and transmits it to any number of recording devices, either through direct (e.g., wired) connection or wirelessly. Continuous distribution of SMPTE timecode is cumbersome. It requires either wiring recording devices to a local master clock, which reduces their flexibility, or deploying a wireless infrastructure that is both expensive and complex to configure, and therefore beyond the capability of many productions. A common compromise is to connect the local master clock to each recording device briefly—something referred to in the art as "jamming"- to set their internal clocks, and then rely on these internal clocks for timestamping the media. The process is labor intensive and error-prone. Part of the challenge is in variable accuracy of recording devices' clocks. Even in high-end, professional cameras the clocks can drift as much as a frame in two to three hours, rendering their initial synchronization useless.

FIG. 3 is a diagram illustrating various conventional schemes for generating and distributing SMPTE timecode to multiple recording devices via a combination of wired and/or wireless timecode distribution schemes. As indicated by reference number 300, a first conventional timecode distribution scheme involves wiring multiple recording devices to a local master clock that transmits the relevant timecode signal to each recording device via the wired infrastructure. Timecode distribution schemes that are based on a wired solution have the obvious drawback of being less mobile. That is, the placement of the recording devices is confined to a particular area that is defined by the reach of the cables or wires used to connect the equipment for purposes of distributing the timecode signal. Additionally, the cables or wires create obstacles that must be navigated by people, who, in many instances, may not be generally familiar with the location.

A second timecode distribution scheme, as illustrated with reference number 302, involves intermittently synchronizing the internal clock of each recording device with a local master clock—a process generally referred to in the industry as "jam sync." Using this technique, each recording device operates as a slave. Before recording begins for a day or for a session, someone will temporarily attach to each recording device a local master clock device for the purpose of synchronizing the individual internal clocks of the recording devices with the local master clock of the local master clock device. Several problems arise with this general approach. First, timecode generation is dependent upon each individual internal clock of each recording device. Immediately after synchronization occurs, the timecode may be generated properly. However, over even a small amount of time (e.g., a half day), the independent internal clocks of the recording devices are likely to drift apart, and thus, someone will be required to re-attach the local master clock device, and re-sync the internal clocks of each recording device to the local master clock. Using this timecode distribution scheme, the synchronization process must be repeated every day, if not multiple times per day. Because many recording devices might be in use, there is always an opportunity that someone will inadvertently forget to synchronize one of the many recording devices in use. Because many recording devices do not have any visible notification to indicate when a recording device has been properly synced, mistakes may not be easily recognized. Finally, if a recording device is powered off and/or re-booted subsequent to having its internal clock synchronized with the local master clock, the internal clock of the recording device may fall out of sync with the local master clock and a subsequent re-sync operation may be required.

As illustrated with reference number 304, a third timecode distribution scheme involves distributing the timecode signal via a wireless communications network. In this scheme, each recording device is outfitted with a wireless receiver for receiving a time signal from a local master clock device, which transmits the time signal wirelessly using a radio transmission in concert with a local master clock. This timecode distribution scheme is problematic in as much as it requires significant knowledge to configure the individual devices to communicate wirelessly. For example, the individual antennas need to be positioned properly to receive the radio transmission from the local master clock. Additionally, other radio transmissions may interfere with the time signal being broadcast. The distance between recording devices is limited by the distance over which the time signal can be reliably transmitted.

Referring now to reference number 306 of FIG. 3, a fourth timecode distribution scheme is illustrated. In this example, a wireless mesh system is used. The wireless mesh system 306 is similar to the wireless local master clock scheme with reference number 304, but each recording device is outfitted with a device that is both a receiver and transmitter, such that it can both receive the time signal wirelessly, and also re-broadcast or re-transmit the time signal. This has the added benefit of extending the reach of the wirelessly transmitted radio-based time signal, but generally at the cost of additional complexity in terms of configuring the individual devices. Furthermore, this timecode distribution scheme is subject to most of the same issues as the wireless local master clock scheme, with reference number 304.

With the conventional timecode distribution schemes described in connection with FIG. 3, there are many different devices that need to be configured properly in order for the timecode to be generated and distrusted successfully. By way of example, with many conventional timecode distribution schemes, the relevant equipment generally needs to be configured to indicate whether the equipment is to operate as a master device—generating and distributing a timecode signal—or alternatively, as a slave device—receiving a timecode signal from another device designated as a master device and having a local master clock. Many timecode generating devices can be configured to operate in what is referred to as "free run" mode, such that the timecode signal is generated independently of whether the recording device is actively recording, or alternatively, "record run" mode, where the timecode signal is generated only when the recording device is actively recording. Almost all timecode generating devices include a clock that needs to be configured. To the extent that the local master clock is configured to correspond with actual time, the setting of the local master clock is subject to errors—even only a few seconds' difference translates to hundreds of frames. Many timecode generating devices include other advanced configuration settings, such as user bits (a custom field for capturing meta-data), an output level designation for an audio signal, and drop-frame or non-drop-frame timecode formats for use with non-integer framerates compatible with National Television System Committee (NTSC) video standards. As evidenced by the variety of timecode distribution schemes summarized above, it is readily apparent that there are numerous issues that may arise with conventional timecode generating devices. Accordingly, there exists a need for improved timecode generating devices.

BRIEF DESCRIPTION OF THE DRAWINGS

Embodiments of the present invention are illustrated by way of example and not limitation in the figures of the accompanying drawings, in which:

FIG. 11 illustrates a table that provides data for use in generating timecode for a non-integer framerate (e.g., 29.97 fps), from an input signal consistent with a different time base, such as UTC, or some other standard measure of time, consistent with embodiments of the invention.

DETAILED DESCRIPTION

Figure 1:
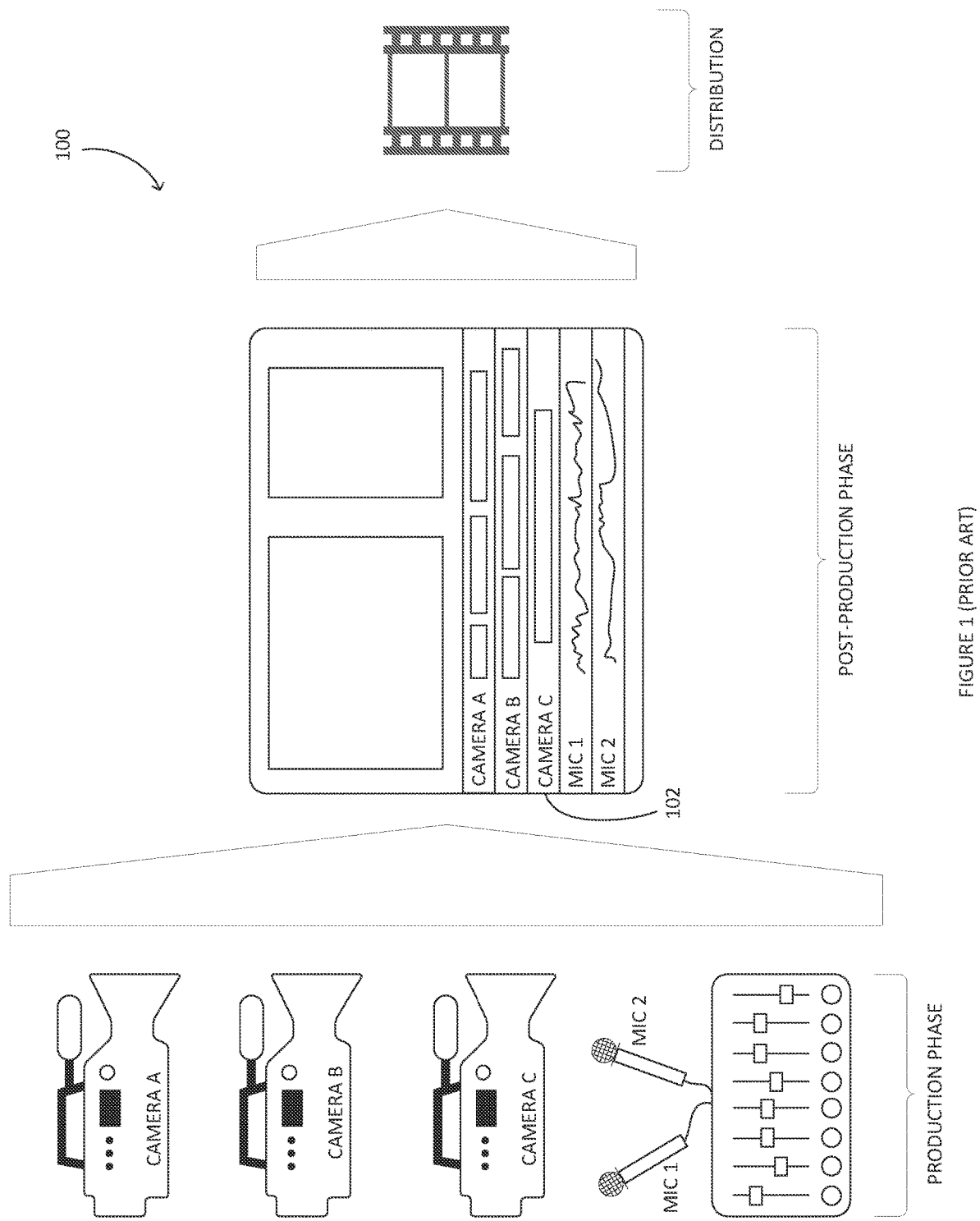
FIG. 1 is a diagram illustrating three phases of a recording production that involves recording an event or performance with the use of multiple recording devices (e.g., cameras and microphones), resulting in multiple recordings of the same event or performance.
Figure 2:
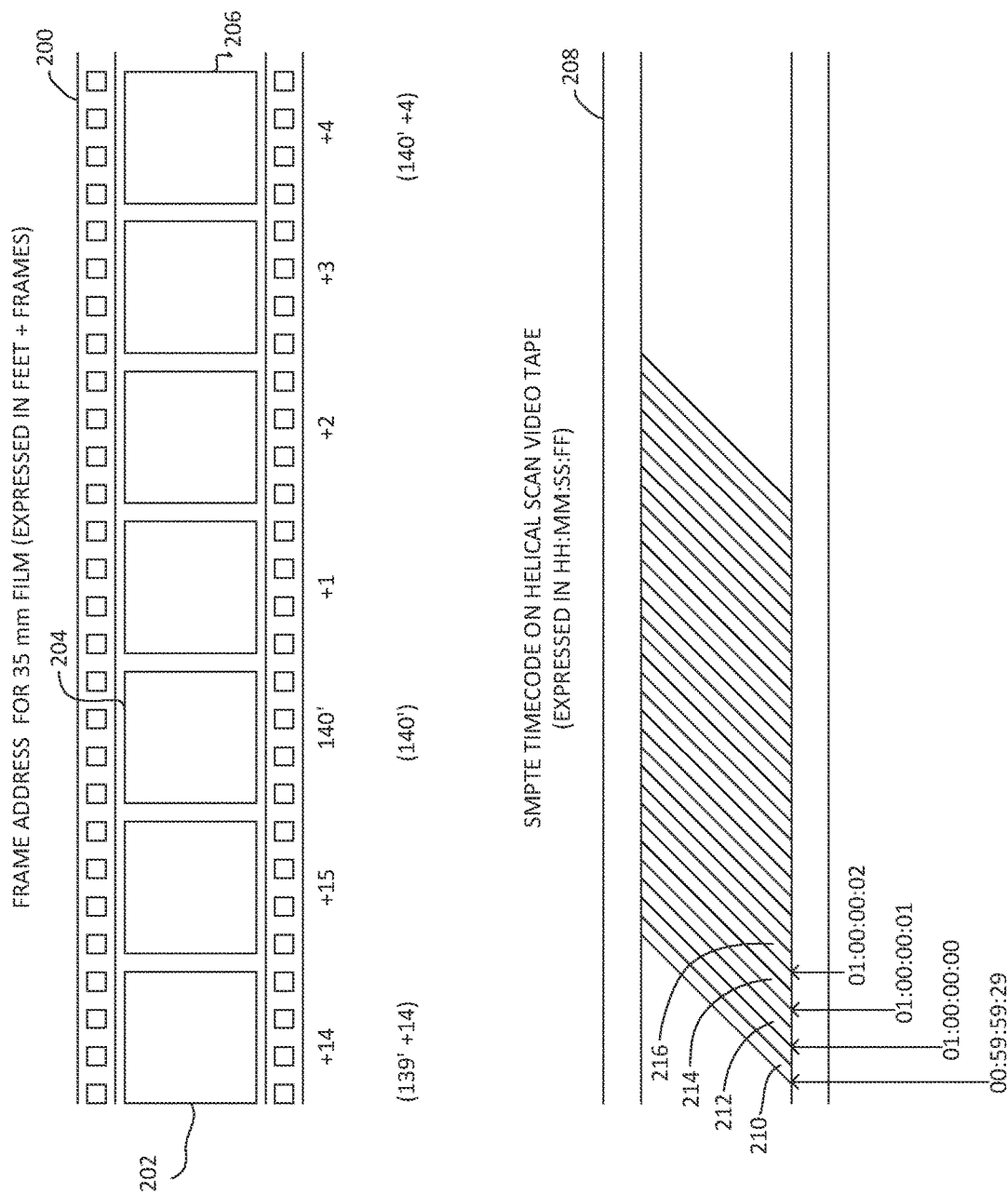
FIG. 2 is a diagram illustrating two different conventions for addressing or naming individual frames of a recording—including a first convention for addressing/naming frames on a 35 mm film reel expressed in terms of distance (e.g., feet plus frame), and a second convention for addressing/naming frames on a helical scan video tape, expressed in a manner consistent with SMPTE timecode.
Figure 3:
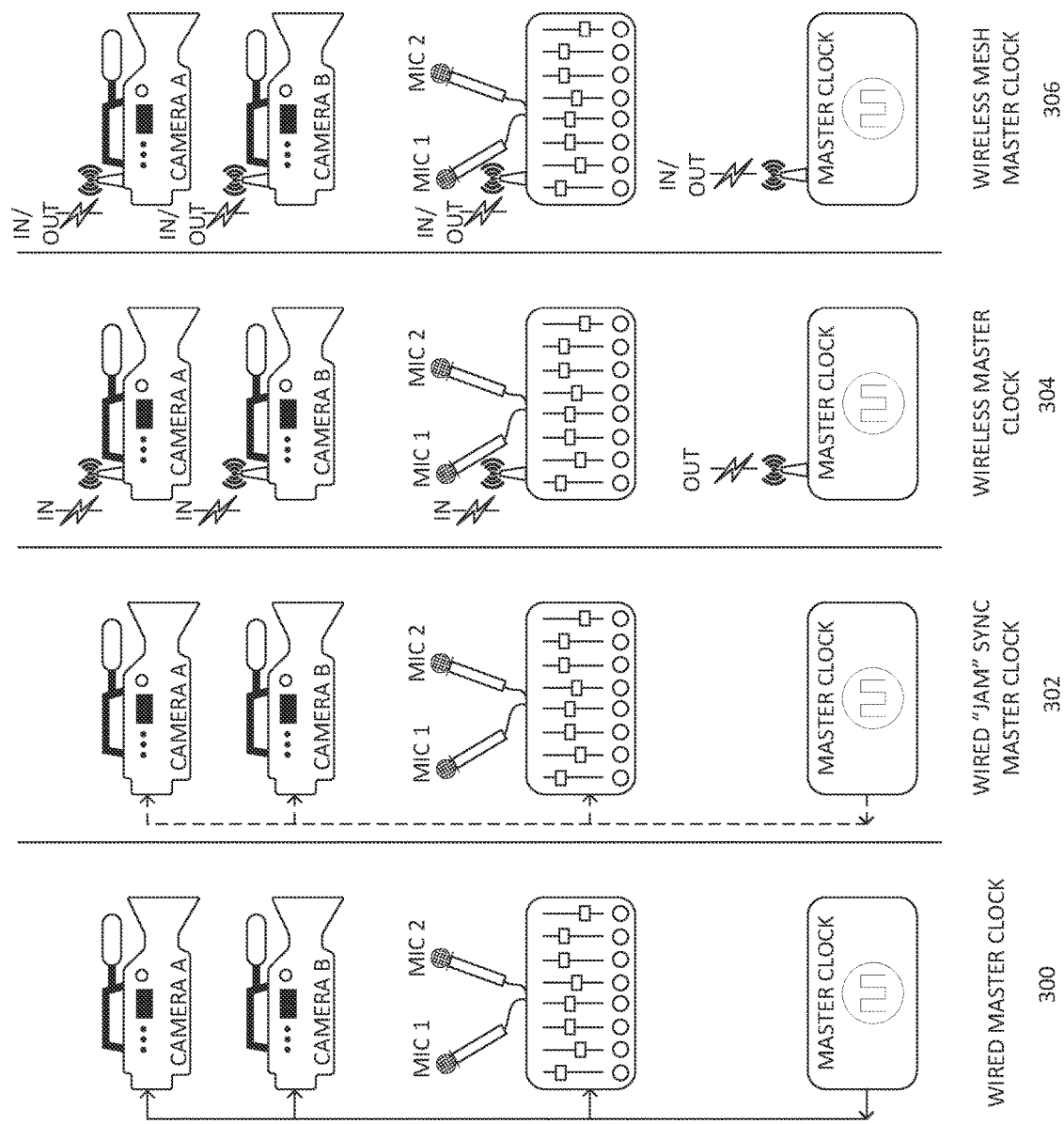
FIG. 3 is a diagram illustrating various conventional timecode distribution schemes for generating and distributing SMPTE timecode to multiple recording devices via a combination of wired and/or wireless frameworks.

Described herein is an apparatus (e.g., a timecode generating device) and method for generating timecode based on a publicly available, radio-based time signal. Specifically, the present disclosure describes techniques for generating timecode with a timecode generating device that has minimal configuration settings, and is therefore far less disposed to human error, in a way that supports multiple framerates including non-integer framerates that do not align with the time base of the radio-based time signal. In the following description, for purposes of explanation, numerous specific details and features are set forth in order to provide a thorough understanding of the various aspects of different embodiments of the present invention. It will be evident, however, to one skilled in the art, that the present invention may be practiced with varying combinations of the many details and features described herein.

Timecode has generally improved the process by which separately recorded media are identified, organized and ultimately synchronized in post-production. However, conventional timecode distribution schemes and timecode generating devices are expensive, complicated, and require extensive knowledge to configure and properly operate. As an example, many timecode generating devices require rather extensive knowledge to configure. Some of the many configuration settings that may be required include (but are not necessarily limited to): the current time, the current location or time zone, a reference time (e.g., beginning time for generating timecode, if not actual time), a master or slave designation, a framerate, a drop-frame or non-drop-frame format (e.g., for NTSC video formats), a free run or record run mode designation, user bits, and output level for audio recording (e.g., microphone or line out setting). In many instances, certain recording devices will not properly record timecode if the recording device is configured to receive timecode in a particular format, and the actual format of the timecode being received differs from that specified by the receiving recording device. Moreover, in many instances, recording devices do not provide any visual or audible notification to indicate any errors or configuration mistakes. Accordingly, many errors stemming from configuration mistakes are not identified until post-production when it is too late to take corrective action.

Consistent with embodiments of the present invention, a timecode generating device has a radiofrequency receiver capable of receiving a radio-based time signal (e.g., from one or more orbiting Global Navigation Satellite System, or GNSS, satellites), and then generate from the radio-based time signal SMPTE-compatible timecode for communicating to a recording device. Because the time code generating device is configured to use the radio-based time signal as a global master clock, it is not necessary for a person to manually configure or set a current time. Furthermore, with some embodiments, the timecode generating device uses a fixed framerate (e.g., 24 frames per second) and as a consequence, the timecode generating device is essentially plug-and-play, requiring no configuration whatsoever, aside from ensuring that the timecode generating device is powered on and properly connected with the recording device. In other embodiments, the timecode generating device may allow for the selection (e.g., through configuration) of a particular framerate. Because the timecode generating device is configured to receive a radio-based time signal and use that signal as a global master clock from which the timecode signal is generated, it is not necessary to set a current time. Moreover, with some embodiments, the radio-based time signal is received from a constellation of satellites, such as those associated with any one of a number of Global Navigation Satellite Systems. Accordingly, with some embodiments, it is not necessary to configure any settings to identify a current time zone or location. Similarly, consistent with embodiments of the present invention it is not necessary to configure any setting that designates a master or slave operational status of the device.

Another advantage of embodiments of the present invention over conventional timecode generating schemes is that the timecode that is generated by the timecode generating device is directly tied to or associated with a universal, standard measure of time, such as Coordinated Universal Time (UTC), International Atomic Time (TIA), or some other recognized standard for keeping time. Accordingly, the timecode is generated such that the address or timestamp associated with each individual frame of a video recording, and each corresponding segment of an audio recording, accurately reflects the actual time—as would be expressed in UTC or TIA—when the frame or audio segment was recorded. This is in contrast with conventional timecode generating schemes that may or may not have any association with a widely accepted universal measure of time. For instance, with conventional timecode generating devices, a local master clock is typically configured by the end-user. While an end-user may attempt to set the local master clock to coincide with some standard measure of time, in almost all instances there will be some difference between the actual time and that indicated by the local master clock. Another advantage that flows from using a single radio-based time signal—particularly one received via a constellation of satellites—is that the timecode generating device generates accurate and consistent timecode over a broad geographical region. Specifically, with the present invention, consistent and accurate timecode can be generated anywhere on Earth where the relevant satellite signal(s) can be received. Accordingly, when timecode is generated and associated with different media that has been recorded in separate, geographically distant locations, the separate media can easily be synchronized using the generated timecode.

With some embodiments of the present invention, the timecode generating device can be configured to generate SMPTE timecode for any one of several different framerates, including non-integer framerates, specifically those that are consistent with standards established by the National Television System Committee (NTSC). For example, a timecode generating device consistent with some embodiments of the present invention will generate timecode for integer framerates, such as 24 frames per second (fps), 25 fps, and 30 fps, as well as non-integer framerates, such as 23.98 fps, and 29.97 fps. The details of how this is achieved are described in connection with FIGS. 10 and 11 below. Other aspects and advantages of the invention will be readily apparent from the detailed description of the several figures that follow.

Figure 4:
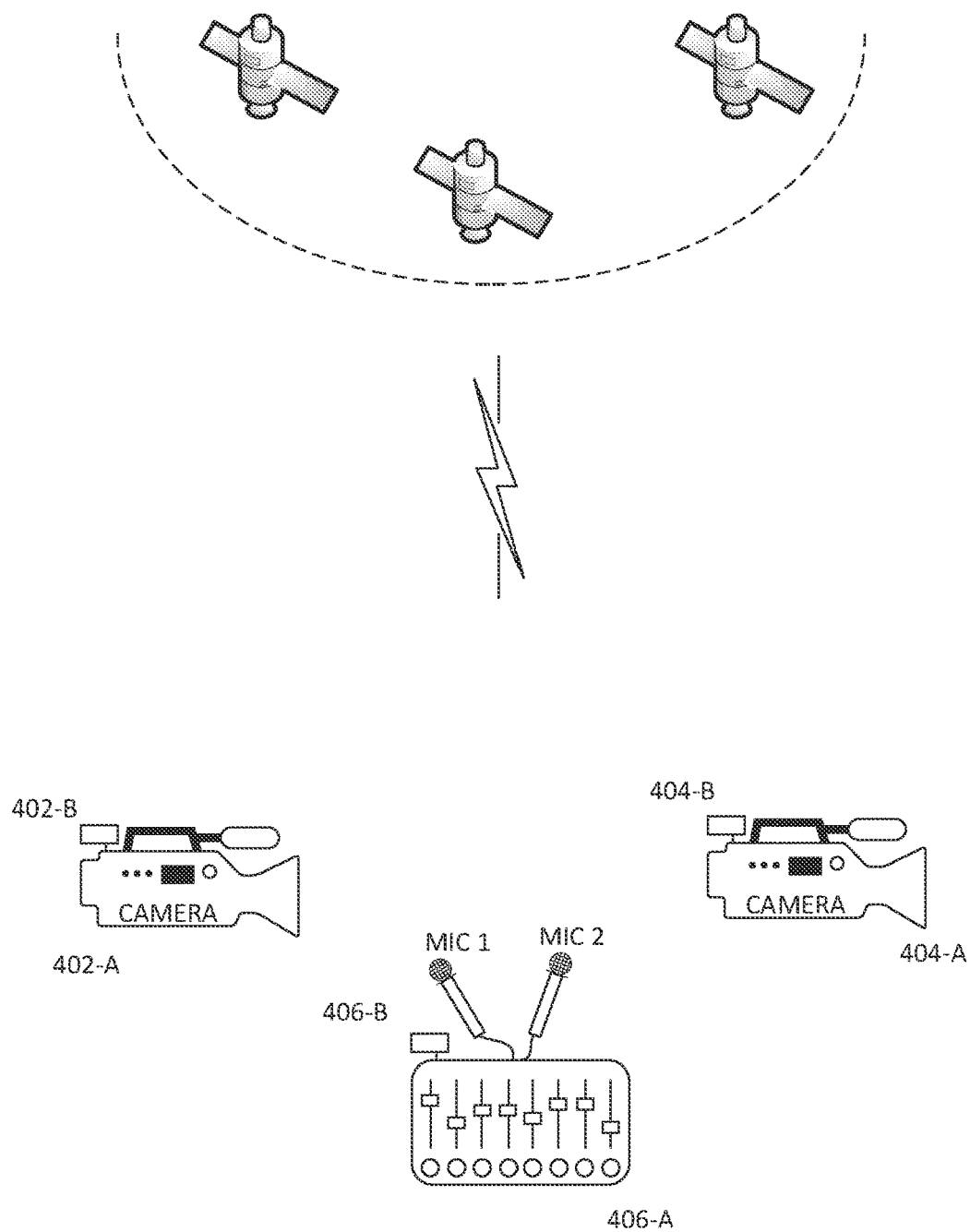
FIG. 4 is a diagram illustrating multiple recording devices for use in capturing the same event or performance, wherein each recording device has been outfitted with a timecode generating device capable of generating timecode based on a radio-based time signal (e.g., such as might be received via a system of orbiting satellites), consistent with an embodiment of the present invention.

FIG. 4 illustrates an example of multiple recording devices including two digital video cameras (402-A and 404-A) and a separate sound recording device (406-A) with multiple microphones—each individually equipped with a timecode generating device (402-B, 404-B and 406-B), consistent with embodiments of the present invention. In this example, the number of devices has been arbitrarily chosen, and in reality, any number of recording devices might be used. Each of the individual timecode generating devices receives a radio-based time signal from a system of satellites in orbit, and based on the received time signal, generates timecode for distribution to the recording device to which the timecode generating device is attached.

A number of satellite constellations in Earth orbit transmit time signals, including the Global Positioning System (GPS), Iridium, GLONASS, Galileo, and BeiDou. Accordingly, with some embodiments, each timecode generating device includes a GNSS receiver capable of receiving and decoding a time signal from one or more satellite constellations. Accordingly, the timecode generating device, upon receiving the radio-based time signal, will process and transform the time signal into an SMPTE-compatible timecode signal for distribution to a recording device. Consistent with some embodiments, media recorded in separate and distant locations with timecode generated by the timecode generating devices can easily be synchronized as the timecode that is generated in each location is consistent, regardless of the location where the media was recorded.

In some alternative embodiments, the radio-based time signal may be received from a source other than GNSS. For instance, with some embodiments, the radio-based time signal is received at the timecode generating device from a terrestrial-based radio transmitter that is connected to a time standard such as an atomic clock, including any one of many national or regional time transmitters. Examples of terrestrial, radio-based time services include those provided by WWV in Fort Collins, Colo.; WWVH in Kakaha, Hi.; DCF in Germany; BPC in China; CHU in Canada; RWM in Russia and others. Additionally, cellular telephony base stations provide local time to subscriber devices as part of their operation. Accordingly, with some embodiments, the timecode generating device may include a radio frequency receiver capable of receiving a radio-based time signal from a cell phone tower, or similar wireless network signal.

Figure 5:
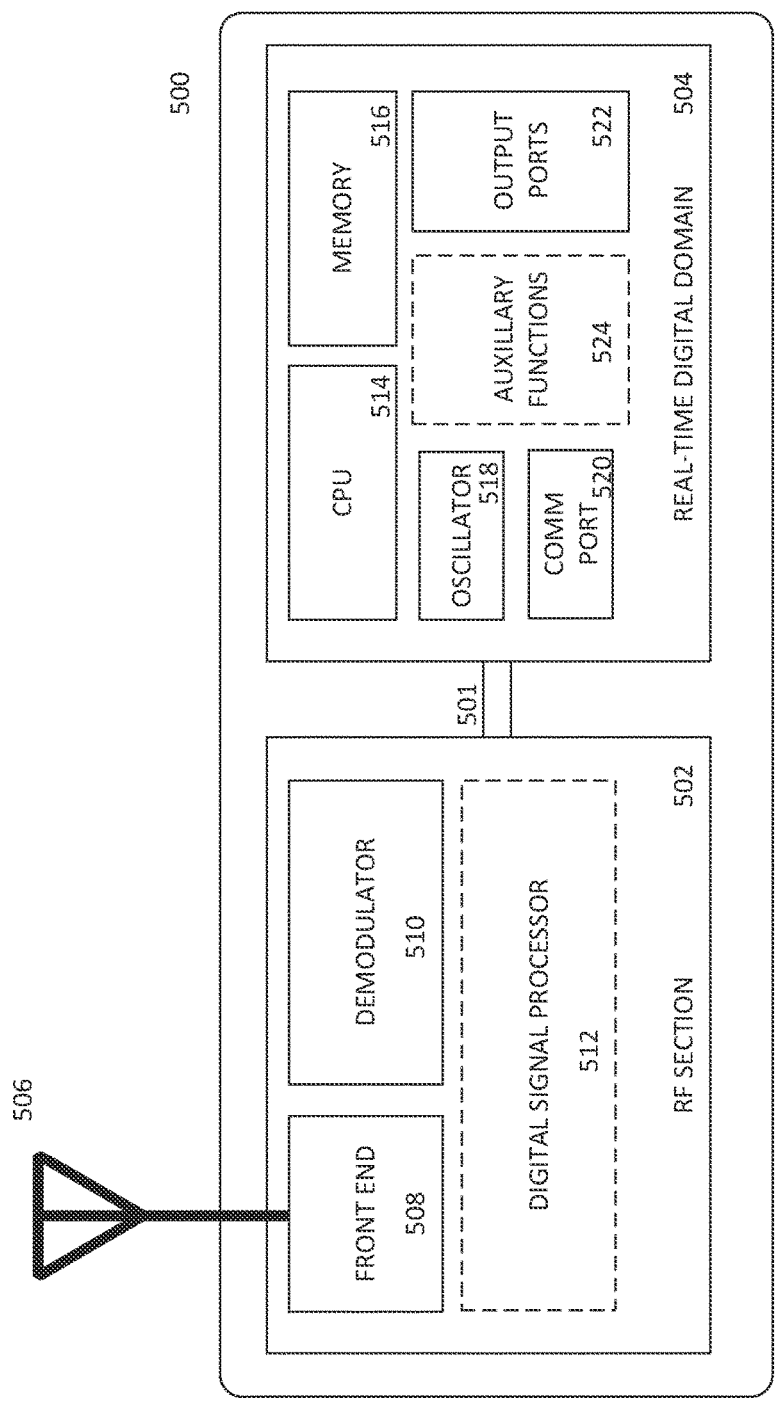
FIG. 5 is a functional block diagram illustrating the various functional components comprising a timecode generating device consistent with an embodiment of the present invention.

FIG. 5 is a functional block diagram illustrating the various functional components comprising a timecode generating device 500 consistent with an embodiment of the present invention. As illustrated in FIG. 5, the timecode generating device 500 is primarily comprised of components for a radio frequency (RF) section 502, coupled to a real-time digital domain 504. With some embodiments, each of these two portions may include application specific circuitry communicatively coupled with one another via a circuit board. In general, the components of the RF section 502 receive, via an antenna 506, a radio-based time signal, decode the time signal, and generate an appropriate signal for communication over the communication bus 501 to the real-time digital domain 504. The real-time digital domain 504 includes components for processing the received information from the RF section to generate one or more output signals based on the time signal received from the RF section. For example, the information received by the real-time digital domain 504 will generally include information indicating the date (e.g., day, month and year) as well as the exact time of day. Based on this information, an output signal compatible with SMPTE timecode is generated. With some embodiments, an additional sync signal (e.g., a gen-lock signal) may also be generated and output to a recording device.

Consistent with some embodiments of the invention, the RF section 502 is comprised of a GNSS receiver module. Accordingly, the application specific front end 508 may receive via the antenna 506 a radio-based signal from one or more GNSS satellites. The front end 508 processes the RF signal(s) (e.g., using signal amplifiers and/or filters for noise, etc.) in order to condition the received signal into a signal appropriate for demodulating by the demodulator 510. The demodulator 510 receives the conditioned signal from the front end 508, and then extracts the original information-bearing signal from the carrier. This information is ultimately communicated to the components of the real-time digital domain 504. The GNSS receiver may perform computation on the demodulated signal to correlate transmissions from multiple satellites and may communicate the result of this computation, rather than raw demodulated signal, to the real-time digital domain.

In other embodiments, the RF section may receive a time-based signal from a terrestrial source. With some embodiments, the RF section 502 may include a digital signal processor 512 for use in generating the appropriate timing signal or signals that are communicated to the real-time digital domain, as described and illustrated in FIGS. 8 and 9.

The real-time digital domain is referred to as such, at least in part, to distinguish the processing that occurs in real-time, consistent with embodiments of the present invention, from that which might be done with a general purpose computer using a conventional multi-tasking operating system. That is, because of the real-time nature of the signal processing that is required, a general purpose processor, using a general purpose operating system, generally will not operate in a manner sufficient to generate the timecode signal.

With some embodiments, the real-time digital domain may be a single device, while in other embodiments, the real-time digital domain may be or comprise individual components. As illustrated in FIG. 5, the real-time digital domain includes a real-time central processing unit (CPU) 514, memory 516, an oscillator 518, a communication (comm) port 520 as well as one or more output ports 522.

In general, the timing signal or information (e.g., date and time) generated by the RF section 502 is received via the comm port 520 of the real-time digital domain. The date and time information are then used as an input to an algorithm that generates SMPTE timecode, which is communicated via the output port 522 to a connected recording device. For example, with some embodiments, the timecode generating device 500 may be configured to generate timecode for one of several different framerates. Accordingly, based on the current date and time information as received, and the selected framerate, the timecode signal is generated to indicate an address or name for each frame of a video recording, or each portion of an audio recording, that is consistent with the selected framerate. With some embodiments, the timecode signal is generated to be consistent with a time base that may differ from the time base of the signal received from the RF section by a fixed or variable offset (i.e., a time difference). By way of example, with some embodiments, the time signal received from the RF section may be consistent with TAI. The real-time digital domain may convert the time signal to be consistent with UTC or another standard measure of time. This may be done, for example, by adding a specific number of seconds to account for differences in the two time bases caused by leap seconds that have been added to one time base.

Although not shown in FIG. 5, the timecode generating device will generally operate with power provided by a battery, which could be a replaceable battery, a non-replaceable battery, a rechargeable battery, or a non-rechargeable battery. Also not shown, consistent with some embodiments a display screen might be included. By way of example, with some embodiments the display screen may be used to present to the end-user any configuration settings, such as the selected framerate, or, information relating to the operational status of the device, particularly the radio frequency section (e.g., GNSS receiver).

Consistent with some embodiments, the timecode generating device 500 will be a standalone device that is coupled with a recording device. However, in other embodiments, the timecode generating device 500 may be one component that is integrated with another device. For example, in FIG. 5, the timecode generating device is shown to optionally include auxiliary components 524. The auxiliary components 524 are presented in FIG. 5 to illustrate and indicate that in various embodiments, the timecode generating device 500 may be integrated as one component of another device that provides other functions. For example, the timecode generating device 500 may be integrated within a recording device (e.g., a video camera, or a sound recording device), a global master clock device for distributing timecode, a game playing device, any of a number of live streaming devices, or any other of a wide variety of devices that may benefit from being able to accurately track and record events with accurate timecode.

Figure 6:
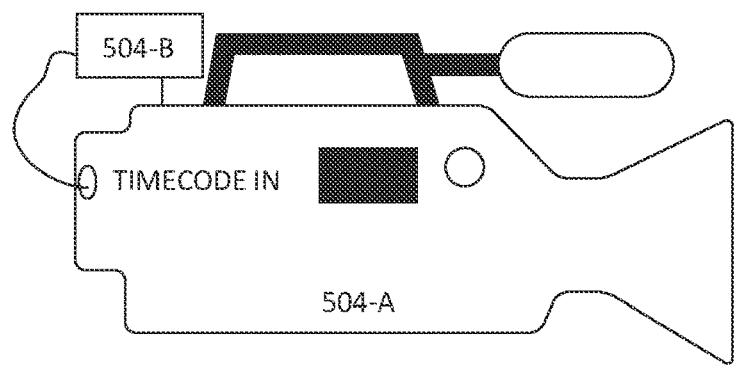
FIG. 6 illustrates various examples of a stand-alone implementation of a timecode generating device, which connects and integrates with a recording device via one or more of several different input ports or terminals, consistent with various embodiments of the present invention.
Figure 6:
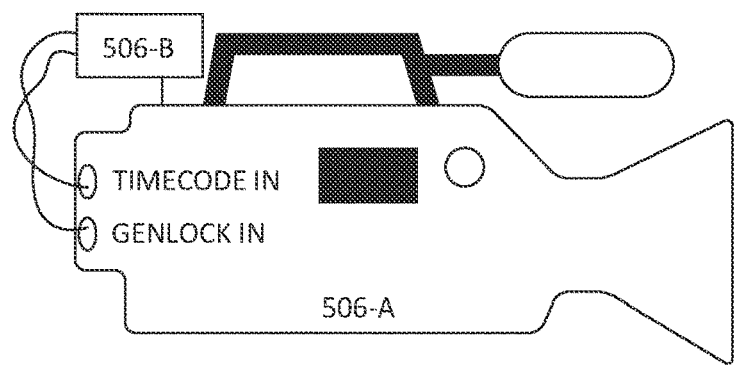
Figure 6:
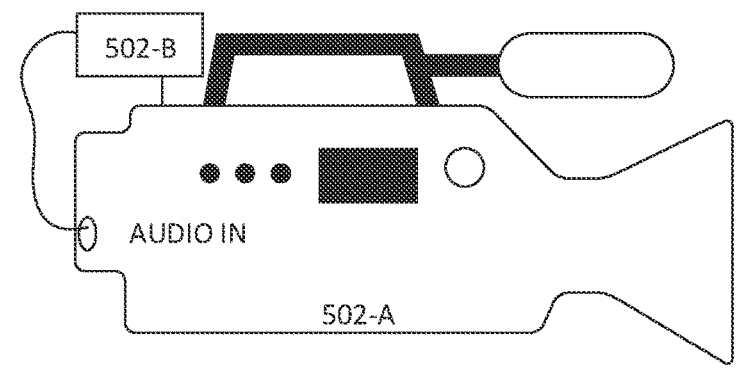

FIG. 6 illustrates three different embodiments of a standalone timecode generating device, each having a different interface by which the timecode generating device integrates and connects with a recording device. By way of example, the recording device (e.g., video camera) with reference 502-A is shown to be connected with a timecode generating device 502-B via an audio-in port of the recording device 502-A. Accordingly, with some embodiments, the timecode generating device 502-B communicates a timecode signal over a conventional audio cable, such that the signal is an audio wave form received and recorded to an audio track of the recording device 502-A. In post-production, the audio waveform is demodulated to derive the timecode information associated with the individual fames of a recording. This particular implementation is advantageous for lower-end (e.g., less expensive), consumer equipment that may not include a dedicated port for receiving a timecode signal.

Referring now to the recording device with reference number 504-A, this particular video camera 504-A includes a dedicated input port for receiving a timecode signal. Accordingly, consistent with some embodiments, the timecode generating device 504-B can be coupled to the dedicated timecode input port of the recording device via an appropriate wire cable. With some embodiments, such as that shown with reference 506-B, the timecode generating device generates both a timecode signal as well as a synchronization signal (e.g., a genlock signal), and as such, the timecode generating device 506-B includes outputs for both signals. As shown, the recording device with reference number 506-A includes dedicated input ports for both a timecode signal and a genlock signal. While the various examples presented in FIG. 6 involve stand-alone timecode generating devices coupled with video cameras, the timecode generating devices will operate with other recording devices, particularly audio recording devices. Furthermore, in some scenarios, the manufacturer of a recording device may implement a stand-alone timecode generating device, consistent with an embodiment of the invention, that uses a proprietary connection interface.

Figure 7:
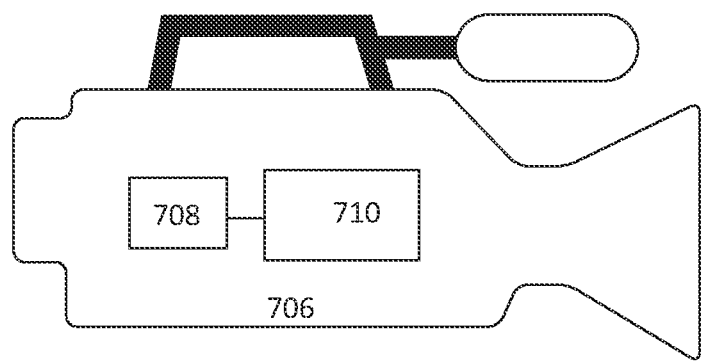
FIG. 7 illustrates two different examples of recording devices (in this instance, digital video cameras) having an integrated (e.g. internal) timecode generating component that is consistent with some embodiments of the present invention.
Figure 7:
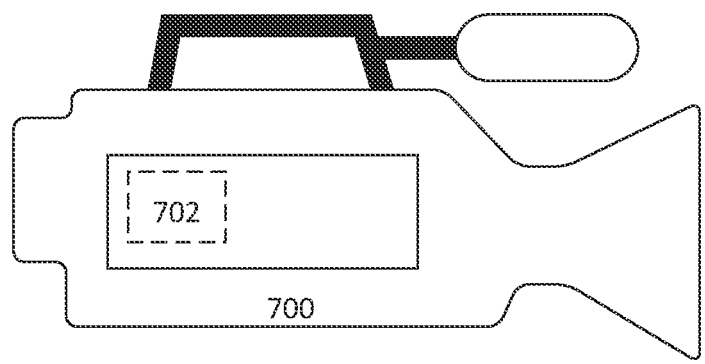

FIG. 7 illustrates two different examples of recording devices (in this instance, video cameras) supporting an integrated (e.g. internal) timecode generating component that is consistent with some embodiments of the present invention. With some embodiments, a timecode generating module 708 consistent with embodiments of the present invention may be provided as a separate hardware component purpose-built to be integrated with a recording device 710, as shown in the top portion of FIG. 7. Consistent with such embodiments, the integrated timecode generating component 708 would draw power from the same power source that powers the recording device. Additional input/output circuitry may be provided as part of the timecode generating component so that the timecode generating component might generate output signals, for example, for displaying relevant information on a display screen of the recording device. Such an example is illustrated in FIG. 7 with reference number 706, which shows the timecode generating component 708 integrated with the digital circuitry and primary processing module 710 of the recording device 706.

As illustrated in FIG. 7, the recording device with reference number 700 includes a software-based, built-in timecode generating module 702, that is integrated with a real-time processing module 704 of the recording device via a communication bus. Accordingly, with some embodiments, the timecode generating device may be built-in to a recording device, leveraging the existing circuitry and hardware components of the recording device in order to generate timecode consistent with embodiments of the present inventions. Such embodiments are possible when, for example, a recording device has an appropriate RF receiver for receiving a publicly broadcast radio-based time signal, and a processing module capable of performing real-time processing. Advantageously, this eliminates the need to physically couple a stand-alone timecode generating device to the recording device, for example, as illustrated and described in FIG. 6.

Figure 8:
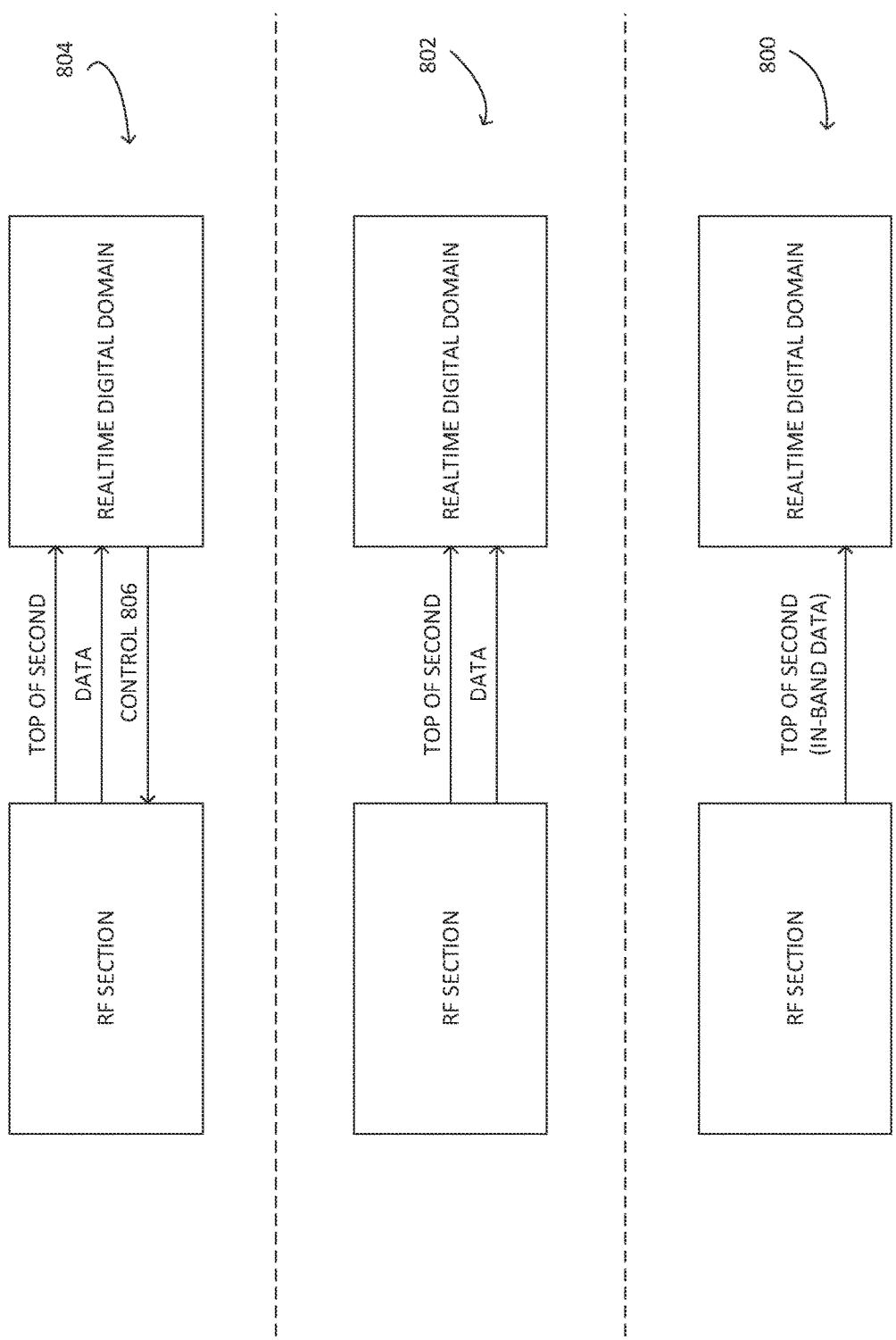
FIG. 8 is a signaling diagram illustrating examples of the various signals generated by and communicated between the primary components of the radio frequency section and the real-time digital domain of a timecode generating device, consistent with embodiments of the present invention.
Figure 9:
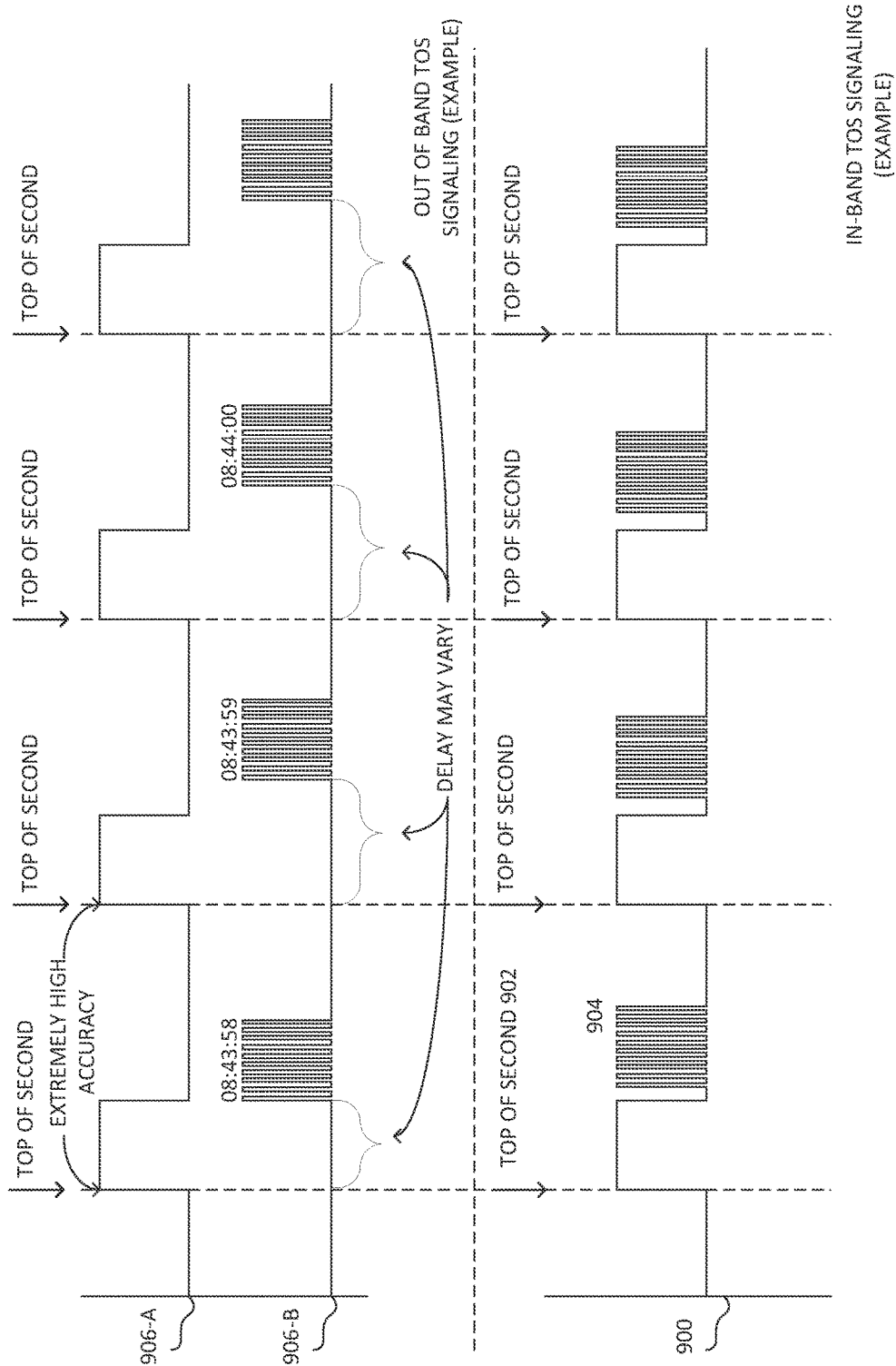
FIG. 9 is a signaling diagram illustrating two ways in which information might be communicated between a component of the radio frequency section and a component of the real-time digital domain of a timecode generating device, consistent with embodiments of the present invention.

FIG. 8 is a signaling diagram illustrating the various signals generated by and communicated between the RF section and the real-time digital domain of the timecode generating device, consistent with some embodiments of the present invention. As illustrated with reference number 800, with some embodiments, information indicating the top-of-second signal is communicated as in-band information with the date and time information. This top-of-second signal is used to determine or derive the rising/falling edge of a pulse-per-second signal. Accordingly, in such embodiments, a single waveform communicates both the precise timing information—that is, the top-of-second information—and the information indicating the current date and time. An example of such a waveform is presented in FIG. 9 with reference number 900. In this example, the rising edge with reference number 902 indicates the top of second signal, while the portion of the signal with reference number 904 is the information indicating the current date and time.

Referring again to FIG. 8, with reference to 802, there is shown an alternative signaling technique whereby the relevant data—that is the current date and time—are communicated out of band. That is, the data are communicated in a separate waveform/signal from the top of second signal. An example of this type of signal is presented in FIG. 9 with reference numbers 906-A and 906-B. For example, the signal with reference number 906-A is the top of second signal, providing the precise timing information, while the signal with reference number 906-B indicates the current time, in UTC time.

Referring again to FIG. 8, with some embodiments, a component of the real-time digital domain may communicate a request (e.g. over a control signal) 806 for additional timing information to the RF section of the timecode generating device. By way of example, some timing information may be infrequently broadcast from the radio-based time service to the RF section, such that the timing information is received on some periodic basis (e.g., every 10 minutes, once per hour, etc.). This information may include, for example, information about adjustments that have been made to a time base, such as the addition of leap seconds and so forth. When an algorithm in the real-time digital domain requires such information to generate accurate timecode signal, the information might be requested via a control signal 806 as illustrated in FIG. 8.

With some embodiments of the present invention, the framerate of the timecode to be generated is fixed, and as such, there is no need to configure the timecode generating device to output timecode for a particular framerate. Instead, when the timecode generating device is powered on and properly connected with a recording device, the timecode is recorded by the recording device consistent with the fixed framerate. In post-production, a wave form representing the timecode can be converted to an appropriate, requested framerate. So long as at least one timecode frame (timestamp) is recorded in a media file, algorithmically determining the appropriate timestamps for each frame in the file is easily achieved in post-production via software.

Figure 10:
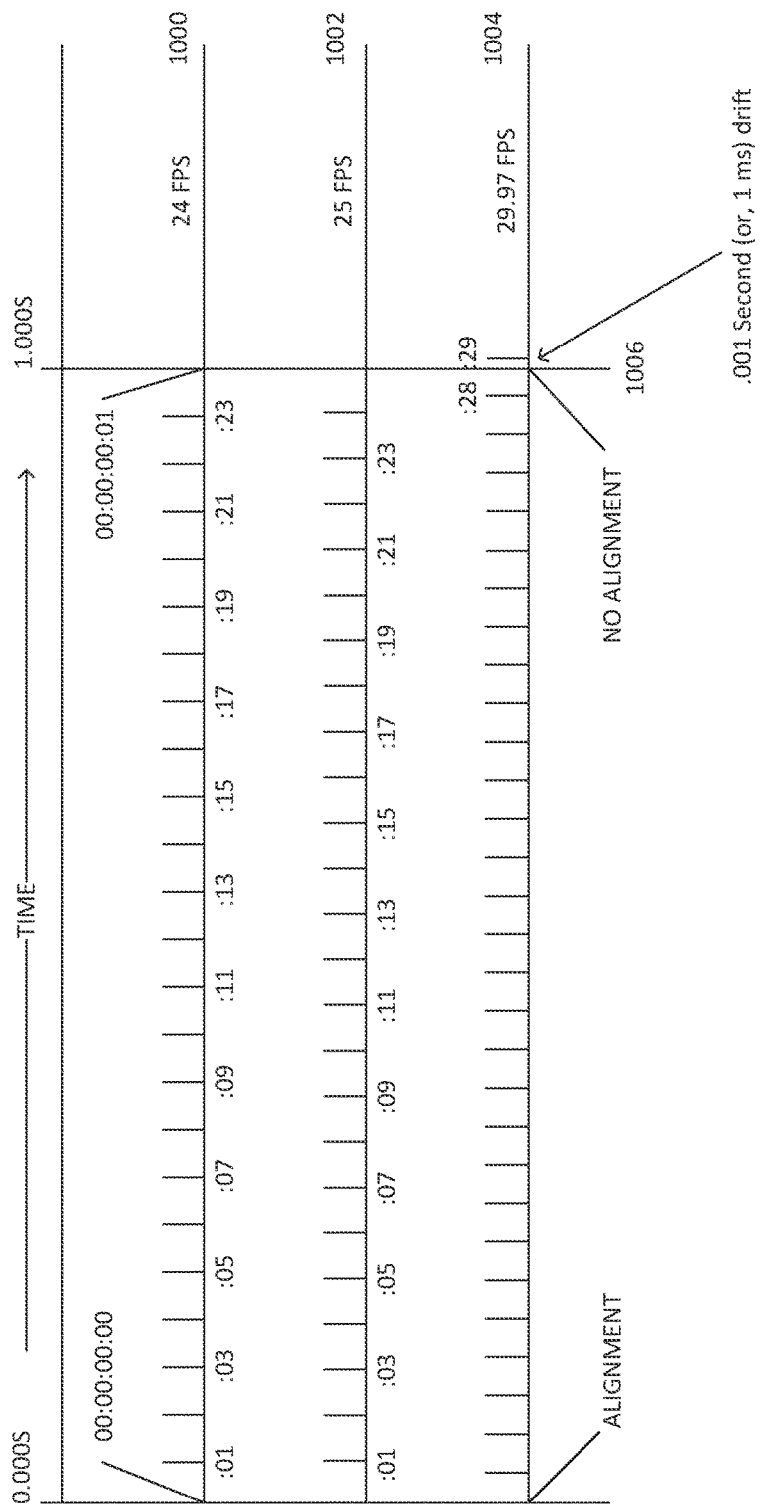
FIG. 10 is a timing diagram that illustrates how certain framerates—particularly those consistent with NTSC standards—have a non-integer number of frames per second, and therefore have a time base that does not frequently align with the time base of the radio-based time signal.

In other embodiments, the framerate can be user-configured—that is selected via an input mechanism on the timecode generating device. Any appropriate selection mechanism (e.g., a rotating dial or switch) may be used. When an integer framerate is selected, the timecode time aligns nicely with the actual time (e.g., UTC, or TIA). This is illustrated in FIG. 10 by the timeline with reference number 1000. Note, at time T=0.000S, the actual time corresponds with frame 00:00:00:00. At time T=1.000S, the actual time corresponds with frame 00:00:01:00. A similar scenario occurs when the framerate is configured to be 25 fps—an integer framerate.

However, this is not the case with non-integer framerates. For example, with non-integer framerates, the number of frames included within a one second interval is not a whole number. This leads to a peculiar situation when non-integer framerates are selected. For instance, because NTSC video formats have non-integer framerates (e.g., 23.98 or 29.97), the actual time does not correspond with a timecode time at one second intervals. Instead, in the case of a non-integer framerate, such as 29.97, the timecode time only aligns with the actual time every 1001 seconds. By way of example, consider the timeline in FIG. 10 with reference number 1004. At time, T=0.000S, the timecode time and the actual time align. However, at time T=1.000S, as indicated by the vertical line with reference number 1006, the vertical line falls between the timecode time for the $29^{th}$ frame (":28") and the $30^{th}$ frame (":29"). As shown in FIG. 10, at time T=1.000S, there is a 1 millisecond difference between the timecode time (at 29.97 fps) and actual time. As each second passes, the difference between the two time bases grows, causing divergence between the actual time and the corresponding timecode time. Accordingly, the actual time will not align with the timecode time again—that is after the first frame at time T=0.000S, until the 30000st frame has been recorded. Conventional timecode generating devices generally handle this issue by varying the frequency of the local master clock on which the timecode is being generated. Accordingly, with conventional timecode generating devices, there is no consistent and accurate way to convert between a timecode time and an actual time.

Consistent with embodiments of the present invention, a table that maps the UTC or TIA second to the correct timecode time may be stored in memory, along with a number indicating the amount of delay, or time difference, that should be added/subtracted to the top of second signal for purposes of generating the output timecode signal. FIG. 11 illustrates a table that provides data for use in generating timecode for a non-integer framerate (e.g., 29.97 fps), from an input signal consistent with a different time base, such as UTC, or some other standard measure of time, consistent with embodiments of the invention. The first column contains what is referred to as the UTC second. This is the actual time as received from the radio-based time service. The second column includes the required delay until the next NTSC second. That is, the second column indicates for each UTC second, the exact amount of delay that needs to be added to the top of second signal for purposes of generating the timecode signal for the non-integer framerate (e.g., 29.97 fps). Finally, the third column includes the timecode time for the next NTSC second. Specifically, the third column maps the second of actual time (e.g., UTC) to the corresponding NTSC second—that is, the time to be used for purposes of generating the next address or name to be assigned to the individual frame of recorded video. Using values presented in the table such as that illustrated in FIG. 11, the timecode generating device can derive from the received UTC second, both the top of second signal—indicating the moment in time of the beginning of each new recorded frame—as well as the proper timecode timestamp (e.g., the unique address or name of the frame) that is consistent with the selected non-integer framerate.

Figure 12:
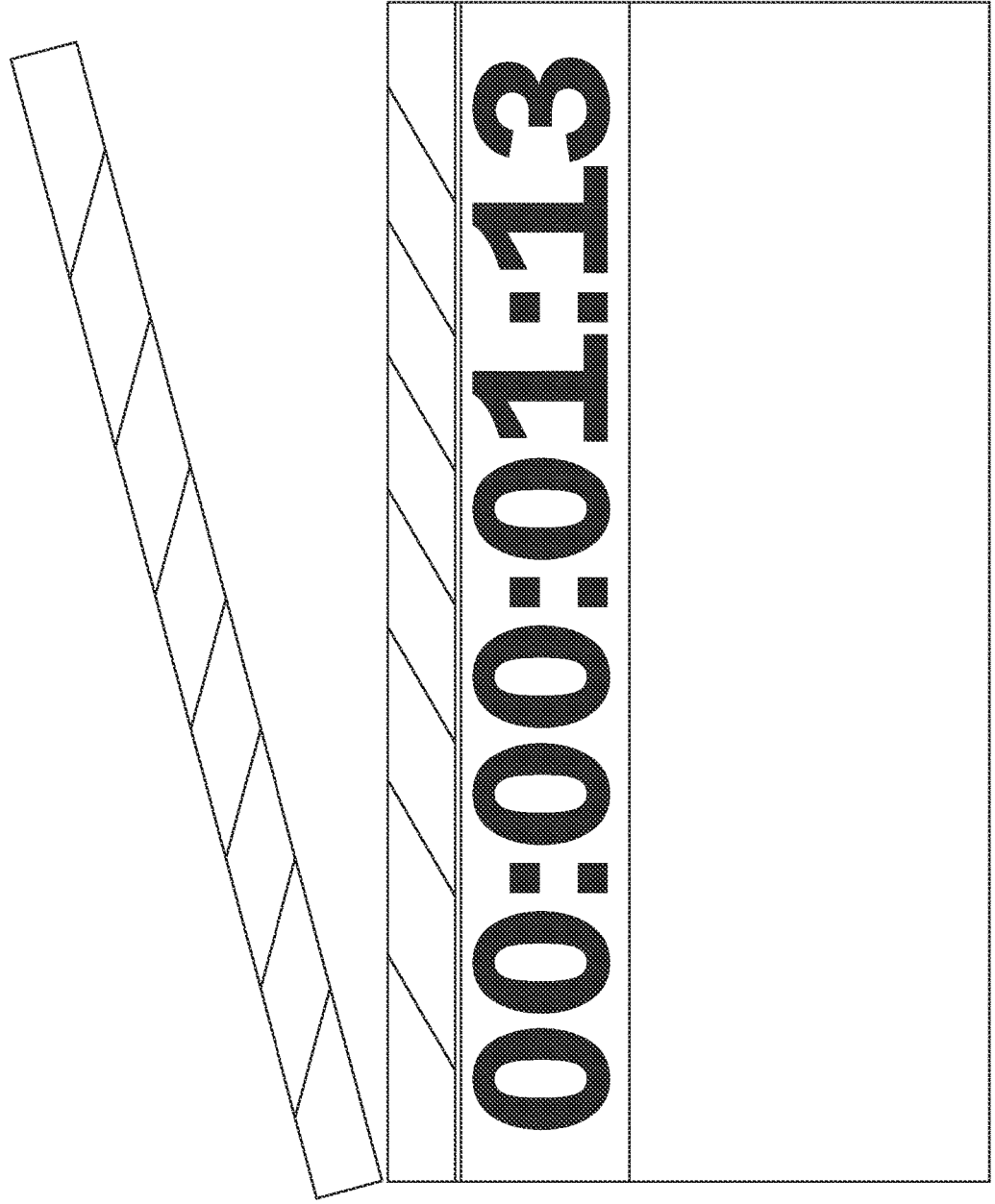
FIG. 12 illustrates an example of a timecode generating device, consistent with embodiments of the present invention, in the form of a smart clapperboard.

FIG. 12 illustrates an example of a timecode generating device, consistent with embodiments of the present invention, in the form of a smart slate. With some embodiments, a timecode generating device, consistent with the present invention, may be integrated into a slate as shown in FIG. 12. Additionally, the slate includes a display device for visually presenting the timecode information, and in some instances, additional meta-data (e.g., the framerate, date, and so forth).

Consistent with some embodiments, the timecode generating device as described herein may be implemented as an integrated component of a wearable camera, sometimes referred to as a body-worn camera, as part of an audio, video, and/or photographic recording system. Accordingly, associating a timecode with the audio, photograph and/or video that is captured via the body-worn camera will not only for synchronization of multiple recordings, but will also instill a sense of public trust and reliability in connection with the recordings.

The invention claimed is:

1. A timecode generating device for generating timecode for syncing media recorded at a non-integer framerate, the timecode generating device comprising:
    a radio frequency receiver coupled with an antenna, the radio frequency receiver configured to receive a radio-based time signal from a public time service broadcast via a terrestrial-based radio transmitter;
    a real-time central processing unit communicatively coupled with a memory device, a communication port, and at least one output port; and
    a communication bus communicatively coupling the radio frequency receiver with the real-time processing unit;
    wherein the radio frequency receiver is to decode the time signal to generate information indicating the current date and time of day, and communicate the information over the communications bus to the real-time central processing unit; and
    wherein the memory device is storing instructions, which, when executed by the real-time central processing unit, cause the timecode generating device to:
        process the information received via the communications bus to i) convert times expressed in a first time base consistent with the universal, standard measure of time, to corresponding timecode times expressed in a second time base consistent with the non-integer framerate, and ii) derive a time difference by which a timecode signal is to be adjusted when output by the timecode generating device; and
        output the timecode time as a timecode signal via the output port, adjusted in accordance with the time difference.

2. The timecode generating device of claim 1, further comprising:
    means for optionally configuring the timecode generating device to output timecode consistent with one of a plurality of integer framerates or one of a plurality of non-integer framerates.

3. The timecode generating device of claim 1, wherein the publicly distributed radio-based time signal expresses time in Coordinated Universal Time (UTC), and the non-integer framerate is one of: 23.98 frames per second, 29.97 frames per second, or 59.94 frames per second.

4. The timecode generating device of claim 1, wherein the timecode generating device is a stand-alone device enclosed in a housing that can be attached to a recording device and the timecode signal is communicated to the recording device through a wire cable coupling the output port of the timecode generating device to a timecode in input port of the recording device.

5. The timecode generating device of claim 1, wherein the timecode generating device is a component of a slate, wherein a display device is integrated with the slate to present information generated by the timecode generating device.

6. The timecode generating device of claim 1, wherein the timecode generating device is an internal component integrated with a body-worn camera.

7. A timecode generating device for generating timecode for syncing media recorded at a non-integer framerate, the timecode generating device comprising:
    a radio frequency receiver coupled with an antenna;
    a real-time central processing unit communicatively coupled with a memory device, a communication port, and at least one output port;
    a communication bus communicatively coupling the radio frequency receiver with the real-time processing unit; and
    means for configuring the device to output timecode consistent with the non-integer framerate;
    wherein the radio frequency receiver is to receive, via the antenna, a publicly distributed radio-based time signal that is consistent with a universal, standard measure of time, ii) decode the time signal to generate information indicating the current date and time of day, and iii) communicate the information over the communications bus to the real-time central processing unit; and wherein the memory device is storing instructions, which, when executed by the real-time central processing unit, cause the timecode generating device to:

convert times expressed in a first time base consistent with the universal, standard measure of time, to corresponding timecode times expressed in a second time base consistent with a non-integer framerate;

derive a time difference by which a timecode signal is to be adjusted when output by the timecode generating device; and output the timecode time as a timecode signal via the output port, adjusted in time to account for the time difference.

8. The timecode generating device of claim 7, wherein the radio frequency receiver is a Global Navigation Satellite System (GNSS) receiver configured to receive a radio-based time signal from a satellite constellation.

9. The timecode generating device of claim 7, wherein the radio frequency receiver is configured to receive a radio-based time signal from a public time service broadcast via a terrestrial-based radio transmitter.

10. The timecode generating device of claim 7, wherein the non-integer framerate is one of: 23.98 frames per second, 29.97 frames per second, or 59.94 frames per second.

11. The timecode generating device of claim 7, wherein the publicly distributed radio-based time signal expresses time in Coordinated Universal Time (UTC).

12. The timecode generating device of claim 7, wherein the timecode generating device is a stand-alone device enclosed in a housing that can be attached to a recording device and the timecode signal is communicated to the recording device through a wire cable coupling the output port of the device to a timecode in input port of the recording device.

13. The timecode generating device of claim 7, wherein the timecode generating device is a stand-alone device enclosed in a housing that can be attached to a recording device and the timecode signal is encoded within an audio signal and communicated to the recording device through a wire cable coupling the output port of the timecode generating device to an audio input port of the recording device.

14. The timecode generating device of claim 7, wherein the timecode generating device is an internal component integrated with a recording device.

15. The timecode generating device of claim 7, further comprising a battery.

16. The timecode generating device of claim 7, further comprising a display device to electronically display information concerning the status of the timecode generating device.

17. The timecode generating device of claim 7, wherein the information communicated over the communication bus indicating the current date and time includes information indicating a top-of-second signal.

18. A method for generating a timecode signal for syncing media recorded with a non-integer framerate, the method comprising:

receiving via a radio frequency receiver coupled with an antenna, a radio-based time signal from a public time service broadcast via a terrestrial-based radio transmitter;

decoding, by a demodulator, the time signal to generate information indicating the current date and time of day; and executing, by a real-time central processing unit, instructions stored in a memory device to process the information by:

converting times expressed in a first time base consistent with the universal, standard measure of time, to corresponding timecode times expressed in a second time base consistent with a non-integer framerate;

derive an amount of delay by which a timecode signal is to be delayed when output via an output port; and output the timecode time as a timecode signal via an output port, delayed in accordance with the amount of delay.

19. The method as claimed in claim 18, further comprising:

generating and outputting a genlock signal.

20. The method as claimed in claim 18, further comprising:

recording a timecode time from the timecode signal to a recording.

* * * * *